US009607142B2

(12) United States Patent
Dharmarajan et al.

(10) Patent No.: US 9,607,142 B2
(45) Date of Patent: Mar. 28, 2017

(54) CONTEXT AWARE RECERTIFICATION

(75) Inventors: Manjeri R. Dharmarajan, Bangalore (IN); Kaushal K. Kapadia, Pune (IN); Vigneshwarnath Miriyala, Medak (IN); Nataraj Nagaratnam, Bangalore (IN); Darshini G. Swamy, Bangalore (IN); Suyesh R. Tiwari, Bhopal (IN)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 13/228,811

(22) Filed: Sep. 9, 2011

(65) Prior Publication Data
US 2013/0067538 A1  Mar. 14, 2013

(51) Int. Cl.
G06F 21/45   (2013.01)
G06F 21/57   (2013.01)
H04L 29/06   (2006.01)

(52) U.S. Cl.
CPC ............ G06F 21/45 (2013.01); G06F 21/577 (2013.01); H04L 63/102 (2013.01); H04L 63/104 (2013.01)

(58) Field of Classification Search
CPC ..... H04L 63/10; H04L 63/102; H04L 63/105; H04L 63/104; G06F 21/45; G06F 21/577
USPC .......... 726/1–8; 713/182–138; 709/223, 225, 709/226
See application file for complete search history.

(56) References Cited

U.S. PATENT DOCUMENTS 7,194,472 B2 *  3/2007  Excoffier et al.
7,571,473 B1    8/2009  Boydstun et al.
7,707,623 B2 *  4/2010  Cicchitto et al. ................. 726/4
7,921,201 B2 *  4/2011  Urbanek et al. ............... 709/224
8,181,016 B1 *  5/2012  Borgia et al. .................. 713/156
2006/0015930 A1 *  1/2006  Shoham ............................ 726/6
2007/0150934 A1 *  6/2007  Fiszman et al. .................. 726/1
2007/0233600 A1   10/2007  McMahon
(Continued)

FOREIGN PATENT DOCUMENTS

KR    20080017911    2/2008

OTHER PUBLICATIONS

"Chapter 7: Identity Certification—Accounts Meta Information Page Help", Sun Role Manager 5.0.3 Documentation, Sun Microsystems, http://wikis.sun.com/display/Srm503Docs/Identity+Certification#IdentityCertification-AccountsMetaInformationPageHelp, accessed on Jun. 10, 2011, 13 pages.

(Continued)

*Primary Examiner* — Tae Kim
(74) *Attorney, Agent, or Firm* — Stephen J. Walder, Jr.; Reza Sarbakhsh

(57) ABSTRACT

Mechanisms are provided for facilitating recertification of a user access entitlement. These mechanisms collect, from a system resource of the data processing system, access information representative of accesses of the system resource by a user access entitlement. These mechanisms determine that recertification of the user access entitlement, with regard to the system resource, is to be performed and a pattern of access is determined based on the access information for the user access entitlement. A recertification request graphical user interface is output to a user based on the pattern of access. The graphical user interface includes the pattern of access and one or more graphical user interface elements for receiving a user input specifying acceptance or denial of the recertification of the user access entitlement.

21 Claims, 5 Drawing Sheets

(56) References Cited

U.S. PATENT DOCUMENTS

| | | | |
|---|---|---|---|
| 2008/0098484 A1* | 4/2008 | Cicchitto et al. | 726/27 |
| 2008/0288330 A1* | 11/2008 | Hildebrand et al. | 705/10 |
| 2009/0144802 A1* | 6/2009 | Tillery et al. | 726/1 |
| 2009/0150981 A1* | 6/2009 | Amies et al. | 726/5 |
| 2011/0023107 A1* | 1/2011 | Chen et al. | 726/12 |
| 2011/0126111 A1* | 5/2011 | Gill et al. | 715/736 |
| 2011/0307957 A1* | 12/2011 | Barcelo et al. | 726/25 |
| 2012/0023556 A1* | 1/2012 | Schultz et al. | 726/4 |
| 2012/0054841 A1* | 3/2012 | Schultz et al. | 726/6 |
| 2012/0180112 A1* | 7/2012 | Chen et al. | 726/4 |
| 2012/0216243 A1* | 8/2012 | Gill et al. | 726/1 |
| 2012/0224057 A1* | 9/2012 | Gill et al. | 348/143 |

OTHER PUBLICATIONS

"Sustained Compliance Through Automation of Access Recertification and Attestation", A Discussion with ISACA-Atlanta Chapter Members, Jul. 17, 2009, http://www.isaca-atlanta.org/docs/ISACA-ATL-071709-Logic_Trends.pdf, 16 pages.

"Understanding and Configuring the System Log", Last edited Apr. 2, 2010, http://wikis.sun.com/display/OIA11gDocs/Understanding+and+Configuring+the+System+Log, Retrieved from the Internet on Apr. 13, 2011, 5 pages.

\* cited by examiner

CONTEXT AWARE RECERTIFICATION

BACKGROUND

The present application relates generally to an improved data processing apparatus and method and more specifically to mechanisms for performing context aware recertification.

In the computing systems of most organizations today, identity and access management mechanisms are provided for ensuring that the desired users have the appropriate set of access rights to the appropriate set of resources of the computing system, and for ensuring that other users do not have access rights to these resources. People within these organizations often play different roles throughout their employment or association with these organizations. It is important for an organization to ensure that as people switch from one role to another, their entitlements or access rights granted to them in their previous roles are revoked and new entitlements or access rights are granted. The process for revalidating entitlements or access rights granted to a user is known as the recertification process.

Identity management systems today automate some aspects of the recertification process for recertifying user accounts by defining recertification policies and triggering review requests based on the recertification policies defined by the organization. The review request is sent to a designated person in the organization for review. This person logs into the recertification system and is shown a screen such as that depicted in FIG. 1. As shown in FIG. 1, the information provided is general in nature with just the date of the request, the request type, the name of the user for which the request is generated, name of the system submitting the request, the account/access for which recertification is requested, the date by which the recertification is required, and an instruction summary. The information may further include instruction details which consist of a reviewer action to either approve or reject the recertification request, and reviewer comments if any.

Graphical user interface elements may be provided to the reviewer to allow the reviewer to select whether or not to approve or reject the recertification request and enter comments if any. Once the reviewer selects approve, the status of the recertification is updated as being recertified on the particular date. If the reviewer rejects the recertification request, then the account would either be deleted or suspended depending upon the option set in the recertification policy of the system.

It should be noted that the recertification request sent to the reviewer provides no information regarding the user's actual use of the system for which the recertification is requested. That is, a reviewer of the request is given no information upon which to make the determination as to whether to approve or reject the request other than the user's identity and the account identity. As a result, reviewers often have to make the decision as to whether to approve or deny a recertification request blindly or simply use a "gut feeling" as to whether the recertification should be granted or not.

SUMMARY

In one illustrative embodiment, a method, in a data processing system having at least one processor implemented in hardware, for recertification of a user access entitlement. The method comprises collecting, from a system resource of the data processing system, access information representative of accesses of the system resource by a user access entitlement. Moreover the method comprises determining, by the processor, that recertification of the user access entitlement, with regard to the system resource, is to be performed. In addition, the method comprises determining, by the processor, a pattern of access based on the access information for the user access entitlement. Furthermore, the method comprises outputting, by the processor, a recertification request graphical user interface to a user based on the pattern of access. The graphical user interface comprises the pattern of access and one or more graphical user interface elements for receiving a user input specifying acceptance or denial of the recertification of the user access entitlement.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
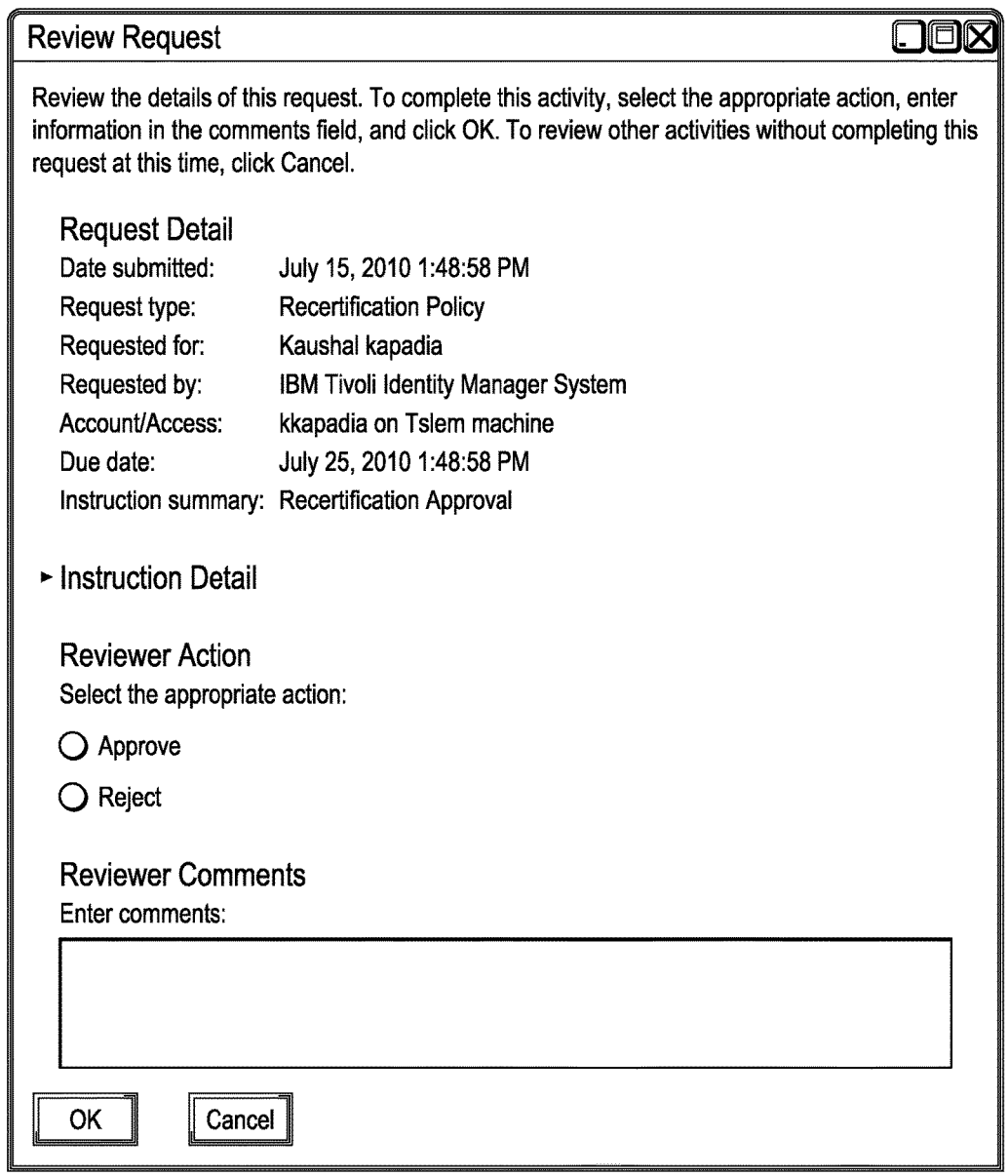
FIG. 1 is an example diagram of a recertification request in accordance with a known mechanism.

The known recertification process described above is flawed in that there is no supporting data provided to assist the reviewer in making a well informed decision on whether to reject or approve a user account recertification request. The reviewer either blindly approves the recertification or goes by gut feeling or instincts as to whether to approve or deny the recertification. As a result, there is the possibility that the reviewer is not aware of changes in roles of the user within the organization and user access rights are not updated appropriately or other mistakes in approving/denying user account recertification are made because of a lack of information. That is, the known recertification process leads to users having entitlements on systems which they no longer need and which may lead to security breaches and failed compliance audits.

The illustrative embodiments provide a mechanism for performing context aware recertification of user access entitlements, which may be defined in terms of user accounts, role memberships, and/or attribute values of a user definition (e.g., ApprovingDoctor, AuditingSpecialist, or the like). The description of the illustrative embodiments set forth hereafter will assume that the user access entitlements are defined in terms of a user account, however this is not intended to state or imply any limitation on the types of user access entitlements upon which the mechanisms of the illustrative embodiments may operate. To the contrary, the illustrative embodiments may operate on any type of user access entitlement specification without limitation. The mechanisms of the illustrative embodiments provide for recertification of the user access entitlements regardless of the particular way in which these user access entitlements are specified in the particular implementation.

The context aware recertification includes the collection and analysis of data from the end systems and applications for which user access entitlements, e.g., user accounts, are to be recertified. This collection and analysis of data from the end systems allows patterns of access by various users to the systems to be generated over various periods of time. These patterns of access may then be compared to determine how one user's access to a particular system fits within the patterns of access of other users of the same system. Based on this comparison, the recertification system may provide a recommendation to the reviewer as to whether the account recertification request should be approved or rejected and, for example, in the case of a recommendation of rejection, highlight or otherwise provide an indication of the reasons why rejection is recommended. As a result, the reviewer is given greater information, i.e. a context, by which to make his/her decision as to whether to grant or deny a user account recertification request.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
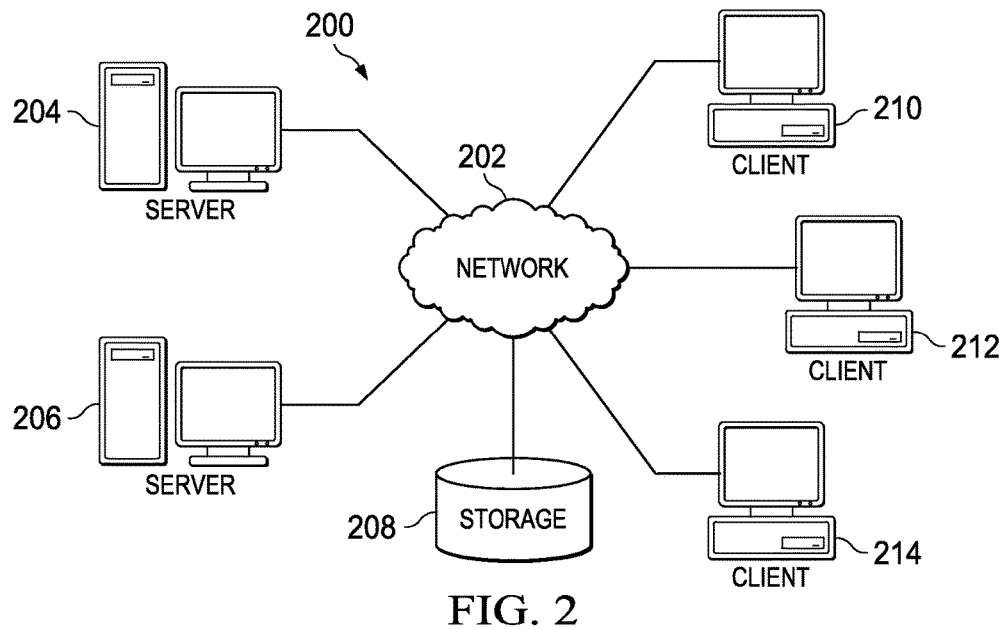
FIG. 2 is an example diagram of a distributed data processing system in which illustrative embodiments of the present invention may be implemented.
Figure 3:
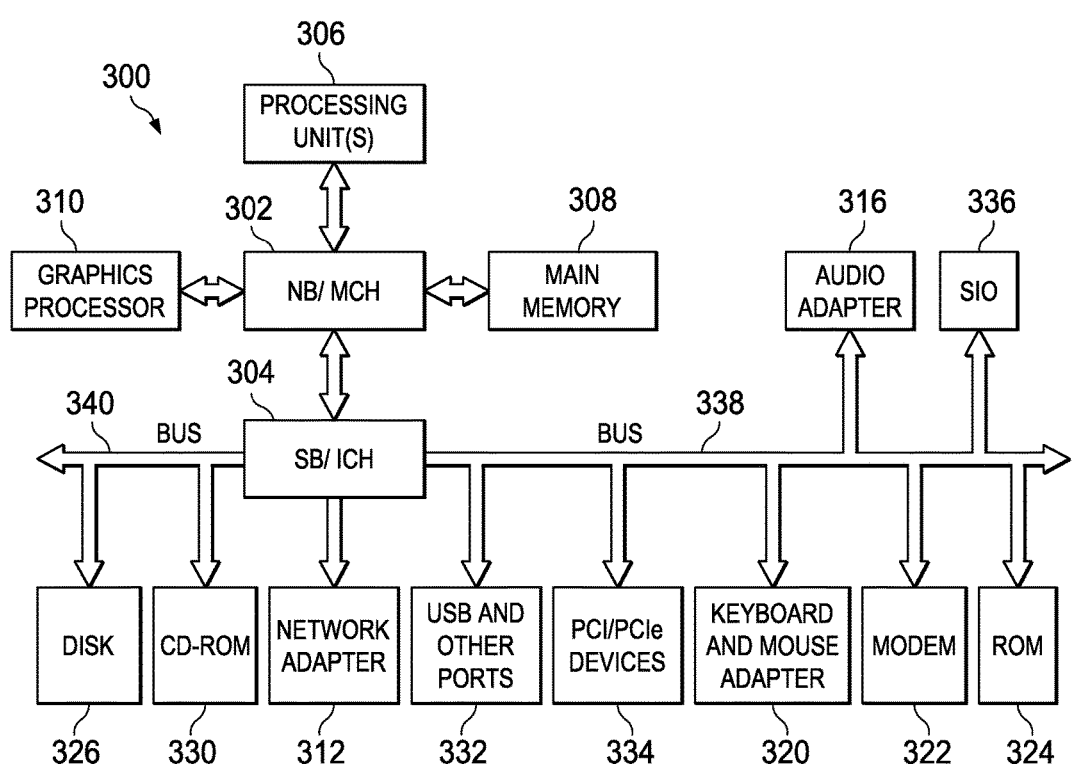
FIG. 3 is an example diagram of a computing device in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an example data processing system is shown in which aspects of the illustrative embodiments may be implemented. Data processing system 300 is an example of a computer, such as client 210 in FIG. 2, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 300 (Java is a trademark of Oracle and/or its affiliates).

As a server, data processing system 300 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device which is configured with flash memory to provide non-volatile memory for storing operating system files and/or user-generated data, for example. Essentially, data processing system 300 may be any known or later developed data processing system without architectural limitation.

With reference again to FIGS. 2 and 3 above, a user of a client computing device, such as client 210, may access system resources, such as, for example, a server 204, network attached storage 208, particular applications/services provided by the server 204, or the like, using the user's user account and associated access rights managed by an identity and access management system implemented on a server or other computing device or set of computing devices, such as server 206 for example. It should be appreciated that this is only an example and that the various types of system resources that may be accessed may be quite varied and may include any type of system resource generally known in the art. Moreover, the system resources may be distributed across a plurality of physical devices, e.g., a plurality of servers, storage systems, etc. Furthermore, the identity and access management system may be distributed across a plurality of computing devices, e.g., a plurality of servers or the like.

The identity and access management system, such as may be provided on server 206, for example, has one or more identity and access management policies defined for determining how to manage user accounts and their associated access rights defined for one or more system resources. In accordance with the illustrative embodiments, these identity access management policies may include one or more defined recertification policies which specify triggering events or conditions for causing a recertification operation to be performed as described hereafter. For example, a triggering event or condition may be the elapse of a predetermined amount of time since a previous certification or recertification operation, for example. In response to such a triggering event or condition occurring, a recertification operation is initiated.

The recertification operation may include, for example, sending a recertification request to a system administrator computing device or the computing device of another authorized individual (the system administrator or other authorized individual being collectively referred to the "recertifier"). Alternatively, a notification may be sent to such a computing device with the recertification request being accessed via a login operation through which a recertifier may access the identity and access management system to either accept or deny the recertification request. The recertifier may then accept or deny the recertification request using a graphical user interface or the like for entering the recertifier's acceptance or denial of the recertification request. As a result, the identity and access management system's registration of certifications of user accounts for accessing system resources is updated to reflect the acceptance or denial of the recertification.

In accordance with the illustrative embodiments, the identity and access management system further comprises mechanisms for monitoring and collecting security information and event logs (also referred to herein generally as "access information") of system resources in servers, end systems (e.g., client computing devices, storage systems, or the like), and applications/services or other types of system resources. Such information may comprise, for example, for each system resource and for each user account, information regarding dates and times for login operations or usage of the system resource, numbers of login operations/usages of the system resource (or frequency of login operations or usage of the system resource), amount of time the user account is used to access the system resource, a last login date/time, and/or the like. Such information may be monitored and collected on a periodic or continuous basis from the various system resources for the various user accounts used to access the system resources. This information may then be input to an analytic engine of the identity and access management system to generate recertification context information and reports for specific user accounts subject to recertification operations.

That is, in response to a triggering event or condition causing a recertification operation to be initiated, the collected security information and event logs for a designated recertification context may be analyzed and used to generate recertification context information and reports that are provided to the recertifier via a recertification request or other graphical user interface of the identity and access management system, as part of the recertification process. This recertification context information provides a context through which the recertifier can be informed of the relative usage of the user account that is subject to the recertification operation in relation to other similar user accounts that access the same system resource.

The recertification context information may be comprised of one or more sub-context views. For example, the recertification context information may be comprised of an identity sub-context view, a resource sub-context view, and/or a transaction sub-context view. The identity sub-context view may be comprised of various context information for identifying the user with which the user access entitlement, e.g., user account, is associated. This may include such context information as a user group, department (e.g., emergency care), location (e.g., Raleigh, N.C.), qualification (e.g., cardiologist), and the like.

The resource sub-context view may be comprised of various context information for describing the resource that is being accessed by the user access entitlement. For example, if the resource is a data resource, the resource sub-context view information may include what kind of data is being accessed (e.g., patient data), how critical the data is (e.g., privacy regulations make the data sensitive), if the data is metadata then what data is the metadata describing (e.g., PatientReportDataBase metadata may be serving information about PatientData, AprilFinanceRecord could be about HospitalBusiness data, etc.). If the resource is a hardware resource, such as a computing device/system, the resource sub-context view information may include what system it is, where the system is in a network, etc., among other information that may be of benefit to the recertifier (system administrator or other authorized individual) when determining whether to permit recertification. If the resource is a software resource, such as an application, service, or the like, then the resource sub-context view information may specify what software resource it is (e.g., HR application or finance application, etc.) among other information that may be of benefit to the recertifier when determining whether to permit recertification. Other types of resources may also be represented with context information in the resource sub-context view as will be apparent to those of ordinary skill in the art in view of the present description.

The transaction sub-context may include various context information for analyzing the types of access operations performed by the user in comparison to other relevant access operations. For example, the transaction sub-context information may comprise context information such as a time period within which access has happened or should happen, what resources are accessed over Internet or Intranet, or whether access is typically done over mobile phone, etc. Other types of transaction sub-context information may likewise be provided as will become apparent to those of ordinary skill in the art in view of the present description.

Figure 4:
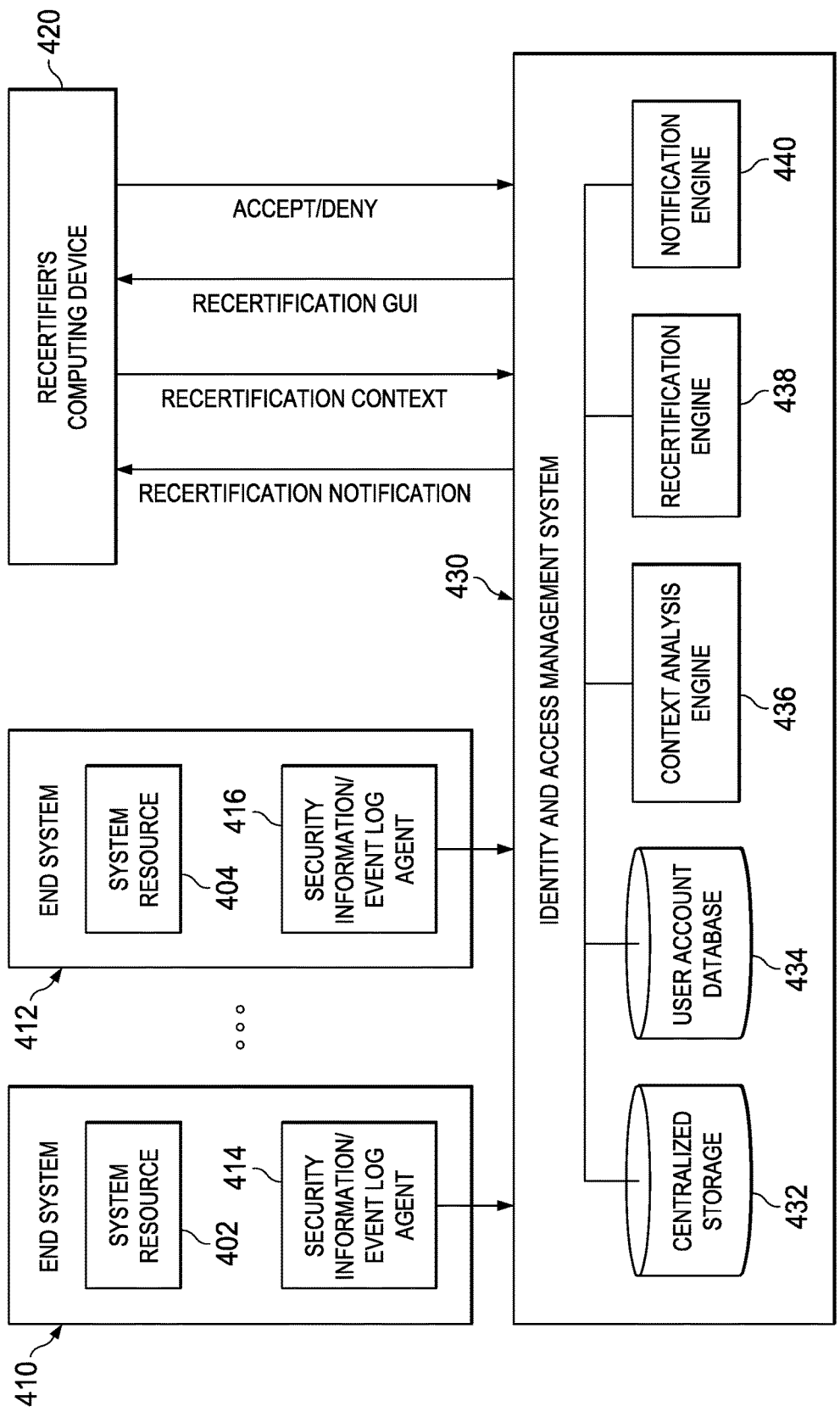
FIG. 4 is an example diagram illustrating the primary operational components of one illustrative embodiment for performing identity management and user access recertification.

The process for recertification of user accounts and access rights will be described in greater detail hereafter with regard to FIGS. 4-6 which set forth one illustrative embodiment for implementing the mechanisms of the present invention. FIG. 4 is an example diagram illustrating the primary operational components of one illustrative embodiment for performing identity management and user access recertification. The operational components shown in FIG. 4 may be implemented completely in hardware or in software executed on one or more hardware devices. In one illustrative embodiment, the operational components shown in FIG. 4 are implemented as software instructions executed on one or more hardware implemented processors of one or more computing devices or data processing systems. The software instructions may be distributed to the one or more hardware implemented processors via one or more computer readable/usable media such as previously described above.

As shown in FIG. 4, the primary operational components comprise one or more system resources 402, 404 on one or more end systems 410, 412. These system resources may be hardware resources, software resources, or any combination of hardware and software resources. For example, the system resources may be processors, memories, storage devices, communication connection bandwidth, particular applications, particular services, or the like. The one or more end systems 410, 412 may include security information and event log generation components 414, 416. The security information and event log generation components 414, 416 may monitor user account accesses to the system resources 402, 404 of the one or more end systems 410, 412 and generate corresponding security information and event logs (collectively referred to herein as "access information") representative of a user account accesses to the system resources 402, 404 for transmission to the identity and access manager system 430 for use in providing recertification context information in accordance with the illustrative embodiments.

The security information and event log generation components 414, 416 may be implemented, for example, by agent software or the like, that may be installed on the end systems 410, 412 and which runs, for example, as a background or daemon process on the end systems 410, 412 so as to monitor accesses to the system resources 402, 404 of the end systems 410, 412. Alternatively, these components 414, 416 may be implemented as hardware devices, such as specialized processors, or other hardware elements, that perform the functions of monitoring system resource access and utilization by user accounts and generation of security information and event logs which are then transmitted to the identity and access management system 430.

The security information and event logs are transmitted from the security information and event log generation components 414, 416 to the identity and access management system 430 which stores this security information and event logs in a centralized storage system 432. This information may be provided to the identity and access management system 430 on a periodic or continuous basis as user accounts are used to access the system resources 402, 404. The security information and event logs may be stored in the centralized storage system 432 in association with an identifier of the system resource 402, 404 and/or the particular user account(s) that was accessing the system resource 402, 404 when the security information and event log(s) were generated. The security information and event logs may be stored in such a manner as to facilitate retrieval for analysis on a per system resource and per user account basis, for example.

A user account database 434 is also provided in the identity and access management system 430. The user account database 434 stores user account information including login information, user information (including contact information, roles, and the like), access rights information, certification information, group associations for each user account, and the like. User accounts may be grouped into groups of user accounts based on similar characteristics of the user accounts, e.g., department of an organization in which the user of the user account is associated, location for which the user of the user account works in an organization, user role within the organization, user role for accessing system resources within a computer system of the organization, or the like. Such groupings may be performed on a system resource basis such that a user account may have a plurality of group associations, one for each system resource that the user account accesses, for example. In one example embodiment, user account groupings for a particular system resource may be based on roles of user accounts associated with the system resource, e.g., administrator role, power user role, guest access role, or the like, with each group having its own corresponding identifier. The grouping of user accounts for each system resource may be performed by the identity and access management system 430 based on an analysis of the characteristics of the user accounts accessing the particular resource. The user account database 434 may store, for each user account, identifiers of each user account grouping to which the user account belongs in association with an identifier of the system resource.

The groupings of user accounts may be used to assist in determining user account security information and event logs, and the analysis of this information, to be compared to each other to provide recertification context information. That is, for a particular user account that is the subject of a recertification request for a particular system resource or set of system resources, the grouping(s) of that user account with regard to the system resource(s) may be retrieved and security information and event logs for user accounts having a same grouping as the grouping(s) of that user account with regard to the same system resource(s) may be analyzed by the context analysis engine 436. Resulting context information is presented to the recertifier via a recertifier computing device to assist in making a determination as to whether to accept or deny the recertification request.

The identity and access management system 430 may further comprise a recertification engine 438 that analyzes the user accounts in the user account database 434, either periodically or continuously, to determine which, if any, user accounts require recertification. If a user account is determined to need recertification, then a notification engine 440 of the identity and access management system 430 may send a notification to a recertifier computing device requesting that the person requesting that the person authorize recertification of the user account. The notification may provide the additional recertification context information of the illustrative embodiments, or this information may be provided to the person performing the recertification in response to the person logging into the identity and access management system 430 to perform the recertification. For purposes of the present description, it will be assumed that the authorized individual accesses the identity and access management system 430 via a login process and is then presented with the recertification context information in a graphical user interface that includes user selectable elements for accepting and denying the recertification request.

Thus, in response to receiving the recertification notification for a particular user account, the system administrator or other authorized individual (herein simply referred to as the "recertifier"), via a recertifier computing device 420 for example, may log into the identity and access management system 430. In response, the recertifier is presented with a listing of outstanding recertification requests. The recertifier may select a recertification request from the listing and is then presented with a graphical user interface for specifying a context for which the recertifier would like to receive recertification context information to assist in accepting/denying the recertification request. The context may comprise, for example, a date range for which security information and event logs should be analyzed, particular user account groupings for which context analysis is to be performed, e.g., same grouping as user account, all groupings for the system resource, selected groupings from a list of groupings for the system resource, and/or the like, for example.

In response to the recertifier specifying the context, the context analysis engine 436 retrieves the corresponding security information and event log information for the system resource(s) meeting the context criteria specified by the recertifier. The retrieved security information and event log information is then analyzed by the context analysis engine 436 to provide various recertification context information to the system administrator. The particular analysis performed by the context analysis engine 436 may take many different forms. For example, the analysis may comprise determining a usage time of the system resource(s) by the user account compared to how other users are using the system resource(s), a frequency of usage of the system resources by the user account compared to how other user's frequency of usage of the system resources, determining a last login date/time in comparison with other user's last login date/time (e.g., hours since last login or the like), etc. Any type of analysis of security information and event logs that facilitates a comparison of the utilization of the system resource(s) by the user account with utilization of the system resource(s) by other user accounts may be used without departing from the spirit and scope of the illustrative embodiments.

As mentioned above, the analysis may include comparing the security information and event log information for the current user account subject to the recertification request with corresponding security information and event log information for user accounts in the specified grouping(s) to generate a recommendation with regard to whether the recertifier should accept or deny recertification of the user account's access to the system resource(s). For example, the security information and event log information may be analyzed to determine if the user account is an outlier relative to the other user accounts in the group(s) specified in the context that are used to access the system resource(s). Whether or not the user account is an outlier may comprise determining if the user account's corresponding security information and event log information is more than a threshold amount different from a greatest, smallest, average, mean, or other statistical representation of the other user accounts in the specified group(s). If the user account is an outlier, then a recommendation to deny the recertification request is generated. Otherwise, if the user account is not an outlier, then a recommendation to approve the recertification request is generated.

Moreover, the comparison may involve comparing the security information and event log information to one or more baseline values or predetermined values. Based on these comparisons, a recommendation as to whether to grant or deny recertification is generated. For example, the security information and event log information may be analyzed to determine a total usage of the user account in a given period of time corresponding to the specified context. The total usage may of the system resource(s) of the user account in the specified period of time may be compared against the baseline or predetermined value (e.g., average usage of system resource(s) by the other user accounts in the specified group(s)). If the total usage of the system resource(s) by the user account in the specified period of time is equal to or above the baseline or predetermined value, then a recommendation to approve the recertification may be generated. Otherwise, a recommendation to deny the recertification may be generated.

As another example, frequency of usage of the user account to access the system resource(s) within the given period of time may be determined and compared against a corresponding baseline or predetermined value (e.g., an average frequency of usage of the system resource(s) by all user accounts in the group(s) specified in the context). If the total frequency of usage of the system resource(s) is equal to or above the baseline or predetermined value, then a recommendation to approve the recertification request is generated. Otherwise, a recommendation to deny the recertification request is generated.

As yet another example, the number of days since a last login to the system resource(s) by the user account may be determined and compared against a baseline or predetermined value. If the number of days since a last login equals or exceeds the baseline or predetermined value, then a recommendation to deny the recertification request may be generated. Otherwise, a recommendation to approve the recertification request is generated.

It should be appreciated that a combination of these various analyses may be used when determining whether to provide a recommendation to grant or deny the recertification request. In such an embodiment, relative weightings may be provided to the various analysis performed in accordance with a configuration of the identity and access management system 430. That is, a recertifier, for example, may specify weightings for different analysis performed by the context analysis engine 436 in accordance with what the recertifier believes to be the relatively more important analysis and less important analysis being performed by the context analysis engine 436. These weightings may be used to generate a score for the results of the analysis. This score may then be compared against a threshold to determine whether to recommend granting or denying the recertification request. Thus, for example if a first analysis results in a recommendation to grant, and a second analysis results in a recommendation to deny, but the second analysis has a relatively larger weight than the first analysis, the resulting score will indicate a recommendation to deny the recertification request when compared to the predetermined threshold value.

In response to the analysis being performed by the context analysis engine 436, the identity and access management system 430 generates a graphical user interface for presentation to the recertifier for accepting/denying the recertification request that includes the results of the context analysis performed by the context analysis engine 436. The graphical user interface for accepting/denying the recertification request may include, for example, information about the user account, the location/department of the user associated with the user account, the role of the user to which the user account corresponds, an identification of the system resource(s) for which recertification is requested, and any other user account information obtained from the user account database 434 for the user account that may be useful to a recertifier when determining whether to accept/deny the recertification request. The graphical user interface may further include the recommendation generated by the identity and access management system 430 as to whether to agree or deny the recertification request.

Moreover, the graphical user interface may include information specifying the results of the analysis performed in such a manner as to facilitate comparison of the user account's accessing of the system resource(s) to accesses of the system resource(s) by other user accounts in the grouping(s) specified in the context. This comparison may be facilitated, for example, by providing various graphical representations of the user account's access information relative to the other user accounts' access information. Bar graphs, line graphs, pie graphs, numerical representations, or other mechanisms for providing relative comparisons may be used without departing from the spirit and scope of the illustrative embodiments.

Furthermore, the representation of the results of the analysis in the graphical user interface may further include highlighting of the portions of the representations that led to the recommendation generated by the identity and access management system 430. For example, if there is one relative comparison that is a primary reason for recommending acceptance or denial, e.g., an analysis whose weighting relative to other weightings was sufficient enough to cause a score for the analysis to transition from one recommendation to another, then the corresponding results of the analysis may be highlighted in the graphical user interface. The highlighting may take many different forms without departing from the spirit and scope of the illustrative embodiments, e.g., different color, different font, different size of representation, flashing, or any other mechanism for highlighting the results relative to other results depicted in the graphical user interface.

The graphical user interface may further include user selectable graphical user interface elements for selecting whether to accept or deny the recertification request. The recertifier may select one of these graphical user interface elements to either accept or deny the recertification request. In response to the recertifier's input, the identity and access management system 430 updates the user account database 434 to reflect the acceptance/denial of the recertification. As a result, the user account either has its certification extended or the certification is either deleted or suspended in accordance with the recertification policies implemented by the identity and access management system 430.

Thus, with the mechanisms of the illustrative embodiments, context information and context analysis is provided to assist a recertifier in making decisions as to whether to accept or deny a recertification request. The mechanisms of the illustrative embodiments may be used to reduce the likelihood that security breaches may be encountered due to errors in recertification processes.

Figure 5:
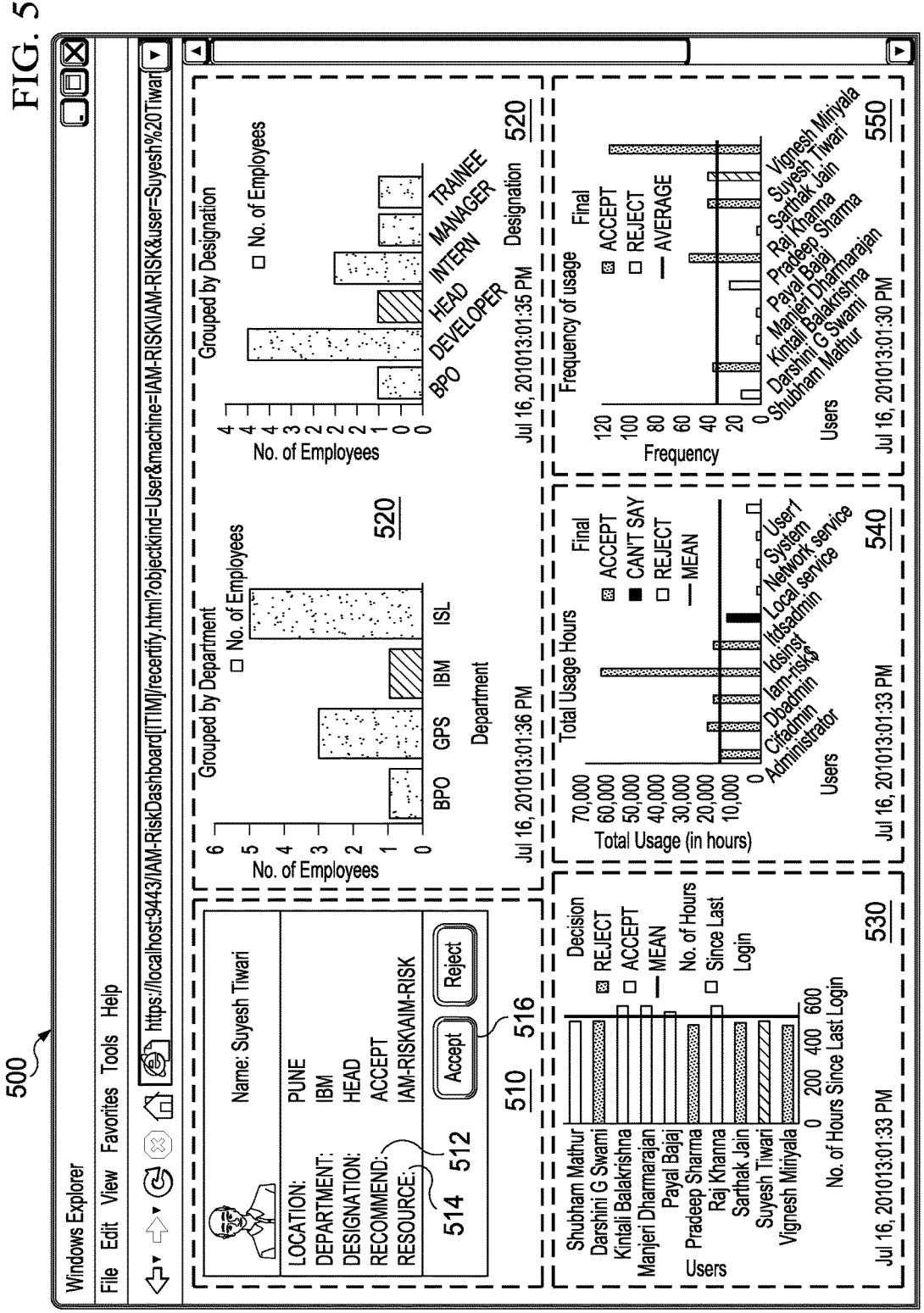
FIG. 5 is an example diagram of a recertification request review and approval graphical user interface in accordance with one illustrative embodiment.

FIG. 5 is an example diagram of a recertification request review and approval graphical user interface in accordance with one illustrative embodiment. The graphical user interface shown in FIG. 5 may be presented to a recertifier as part of an original recertification notification generated and transmitted to the recertifier's computing device (in which case a default context may be used, e.g., a default group and time frame), or may be presented in response to the recertifier logging into the identity and access management system and submitting a context for which recertification context information is desired.

As shown in FIG. 5, the graphical user interface 500 includes a user account information section 510 which includes information about the user account that is subject to the recertification operation. This section 510 may include a user name of the user associated with the user account, an optional picture of the user, a physical location of the user within the organization, a department of the organization with which the user and user account is associated, the user's role or "designation" within the department of the organization, an identification 514 of the computing device or system resources that are the subject of the recertification, and other information that may be pertinent to a recertifier's review of the recertification request. This information may be obtained from a user account database and/or other data sources of the organization, e.g., human resources employee database, system topology database, or the like.

Also shown as part of the user account information section 510 is an identity and access management system's recommendation 512 as to whether to accept or deny the recertification request. As discussed above, this recommendation may be made based on a context analysis of the security information and event logs from user accounts falling within the designated context for the designated system resource(s). This recommendation is only a recommendation and the actual acceptance or rejection of the recertification is made by the recertifier by selecting a corresponding one of the graphical user interface elements 516. While elements 512 and 516 are shown as part of the user account information section 510, this is only one example and the graphical user interface may be organized in other ways without departing from the spirit and scope of the illustrative embodiments. For example, the elements 512 and 516 may be provided in a separate section from that of the user account information section 510.

The graphical user interface 500 further comprises one or more graphical representations of various recertification information that may be helpful to a recertifier when making a determination as to whether to accept or deny recertification of the user account for the designated system resource(s). In the depicted example, various bar graphs 520-550 are provided for depicting recertification context information in a manner that facilitates comparison with other user accounts' utilization of the system resource(s). For example, one set of bar graphs 520 provide information regarding the number of employees that are part of the user's department and have a similar designation or role so as to provide a context with regard to how the user's user account fits within the organization. For example, from these bar graphs, one can determine that the department with which the user is associated has a relatively small number of employees and that the number of employees having a same role or designation as the user is relatively small as well. Thus, one can determine that relative to other employees in the organization, the user of the user account for which recertification is sought is relatively unique within the organization, i.e. the user is the only user having the role of "head" in the "IBM" department, and should more than likely have the recertification accepted.

Additional bar graphs 530-550 provide information corresponding to the results of a context analysis performed on user account security information and event log information. In each of these bar graphs, results within an acceptable range are indicated by a first shaded or colored bar, e.g., a green colored bar, results that are not within an acceptable range are indicated by a second shaded or colored bar, e.g., a red bar, and results that do not squarely fall within an acceptable range or a not acceptable range are presented as s third shaded or colored bar, e.g., a blue bar. The bars corresponding to the user account for which recertification is sought may be presented as yet a fourth shaded or colored bar, e.g., a black bar.

Thus, in the first bar graph 530, a number of hours since a last login is shown with regard to a set of user accounts corresponding to the original context input by the recertifier. For example, these user accounts may all belong to a same group as the user account for which recertification is sought. As can be seen in FIG. 5, some user account bars are of the first shaded or colored bar and others are of the second shaded or colored bar. The bar corresponding to the user account for which recertification is sought closely matches the bars of those user accounts of the first shaded or colored bar and thus, is more likely acceptable than not acceptable. That is the number of hours since the user account was last used to login to the system resource(s) is below a threshold value indicated in the graph by a vertical line and thus, is acceptable.

In the second bar graph 540, the total usage hours of the user account for which recertification is sought, for various ones of the system resource(s) for which recertification is sought, is presented. Again, a line (this time horizontal) is shown in the graph that represents a threshold total usage above which approval of the recertification is recommended. Thus, it can be seen from the second bar graph 540 that recertification is recommend on the first five system resource(s) with recertification on the sixth system resource being questionable and not recommended on the last four system resources.

The third bar graph 550 represents the frequency of usage of the system resource(s) by the user accounts in the designated context again with the bar corresponding to the user account for which recertification is sought being presented in the fourth shaded or colored bar type. Also, again, the threshold for recommending acceptance of the recertification is shown as a horizontal line in the bar graph 550. It can be seen that in the depicted example, the user account's frequency of usage of the system resources is above the threshold and is commensurate with other user accounts' frequency of usage of the system resources and thus, recertification should be recommended.

It should be noted that FIG. 5 is only an example and is not intended to state or imply any limitation on the types of information, the organization of the information, or the particular manner by which the information for recertification may be presented. Many modifications to the depicted example may be made without departing from the spirit and scope of the illustrative embodiments. For example, rather than using bar graphs, various other types of relative depictions may be used including line graphs, pie charts, numerical representations, and the like.

Figure 6:
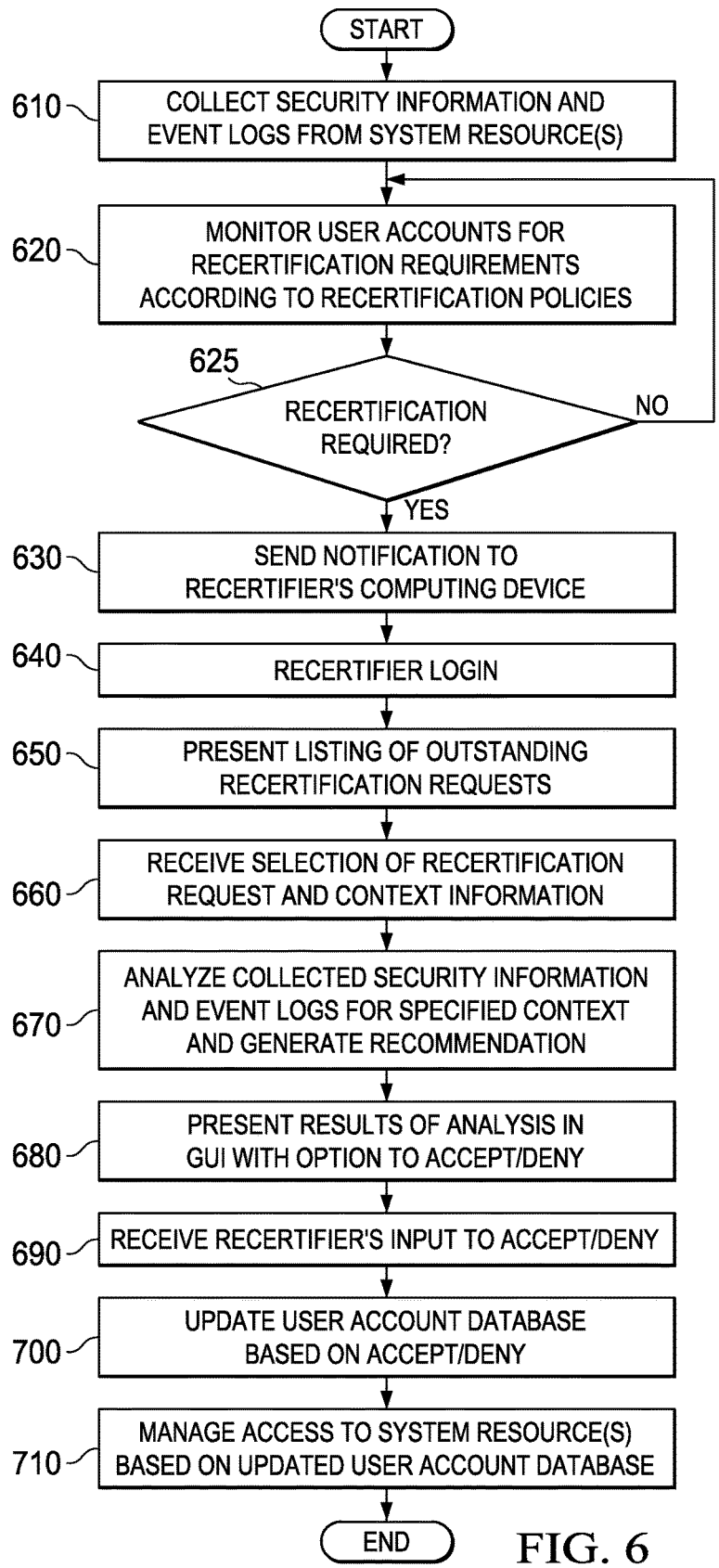
FIG. 6 is a flowchart outlining an example operation for user access recertification in accordance with one illustrative embodiment.

FIG. 6 is a flowchart outlining an example operation for user access recertification in accordance with one illustrative embodiment. The operation outlined in FIG. 6 may be implemented, for example, by the identity and access management system 430 in FIG. 4 or an equivalent system.

As shown in FIG. 6, the operation starts with monitoring mechanisms on end systems collecting security information and event logs and transmitting this information back to the identity and access management system (step 610). This operation may be performed periodically or on a continuous basis. This operation may continue to be performed while the other operations described in FIG. 6 are being performed.

Moreover, either on a periodic or continuous basis, the identity and access management system monitors user accounts, in accordance with established recertification policies, to determine if any user accounts require recertification (step 620). If a user account requires recertification (step 625), a notification is sent to a recertifier computing device (step 630). These operations 620 and 630 may also be performed on a period or continuous basis while other operations in FIG. 6 are being performed.

A system administrator then accesses the identity and access management system through a login process (step 640). The recertifier is presented with a listing of user accounts for which recertification is still pending (step 650).

The recertifier selects a user account requiring recertification from the listing and provides information defining the context for which the recertifier would like recertification context information to be presented (step 660). An analysis engine analyzes collected security information and event logs for the specified context and generates a recommendation as to whether to accept or deny the recertification of the user account (step 670). The results of the analysis are presented along the recommendation in a graphical user interface that comprises graphical user interface elements that may be selected by the recertifier to either indicate acceptance or denial of the recertification request (step 680). The recertifier provides an input specifying whether to accept or deny recertification of the user account for the particular system resource(s) (step 690). The corresponding user account database entries are then updated to reflect acceptance/denial of the recertification (step 700). Access to the system resource(s) is then controlled with regard to the user account based on the updated user account database entries (step 710). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a processor implemented in hardware, for recertification of a user access entitlement, comprising:
    collecting, from a system resource of the data processing system, access information representative of accesses of the system resource by a user access entitlement of a specific user;
    determining, by the processor, that recertification of the user access entitlement, with regard to the system resource, is to be performed;
    determining, by the processor, a pattern of access based on the access information for the user access entitlement; and
    outputting, by the processor, a recertification request graphical user interface to a user based on the pattern of access, wherein the graphical user interface comprises a representation of the pattern of access and one or more graphical user interface elements for receiving a user input specifying acceptance or denial of the recertification of the user access entitlement, wherein the representation of the pattern of access comprises a comparison of a first access metric associated with the user access entitlement of the specific user to a second access metric associated with one or more other user access entitlements of one or more other specific users, and wherein the first access metric and the second access metric are statistical values indicative of previous access operations by corresponding user access entitlements.

2. The method of claim 1, wherein collecting access information from the system resource comprises receiving the access information from an agent component executing on an end system associated with the system resource.

3. The method of claim 1, wherein determining that recertification of the user access entitlement with regard to the system resource is to be performed comprises determining that a triggering condition specified in a recertification policy of the data processing system has occurred with regard to the user access entitlement.

4. The method of claim 1, wherein determining a pattern of access comprises:
    determining, by the processor, a context to use as a basis for determining the pattern of access, wherein the context comprises at least one of an identity sub-context, resource sub-context, or transaction sub-context; and
    determining, by the processor, the pattern of access by analyzing a portion of the access information, specifying previous access operations previously executed, corresponding to one or more of the identity sub-context, resource sub-context, or transaction sub-context.

5. The method of claim 4, wherein determining the context to use as a basis for determining the pattern of access comprises:
    sending, by the processor, a recertification notification to a user computing device indicating that recertification of the user access entitlement is necessary;
    performing, by the processor, a login operation of the user computing device; and
    in response to performing the login operation successfully, providing, by the processor, to the user computing device, a graphical user interface for inputting characteristics of the context.

6. The method of claim 1, wherein the one or more other user access entitlements are user access entitlements having a group association corresponding to a same group identifier as the user access entitlement for which recertification is sought.

7. The method of claim 6, wherein the graphical user interface comprises the pattern of access in the form of a graphical depiction of the first metric relative to the second metric and one or more threshold values.

8. The method of claim 1, further comprising:
determining, by the processor, a recommendation as to whether to accept or deny the recertification of the user access entitlement based on results of the determination of the pattern of access, wherein the recertification graphical user interface further comprises the recommendation.

9. The method of claim 4, wherein the identity sub-context view comprises context information specifically identifying the specific user associated with the user access entitlement, the resource sub-context view comprises context information specifying a specific resource being accessed the user access entitlement, and the transaction sub-context comprises context information for analyzing types of access operations performed by the specific user in comparison to other corresponding access operations.

10. The method of claim 1, wherein the comparison of the first access metric associated with the user access entitlement of the specific user to the second access metric associated with one or more other user access entitlements of one or more other specific users comprises at least one of:
a first comparison the specific user's number of hours since a last logon access operation for logging on to the system resource, to the one or more other specific users' number of hours since a last logon access operation for logging on to the system resource;
a second comparison of the specific user's total usage hours of the system resource to the one or more other specific users' total usage hours of the system resource; and
a third comparison of the specific user's frequency of usage of the system resource to the one or more other specific users' frequency of usage of the system resource.

11. The method of claim 1, wherein the comparison comprises a combination of a selection of two comparisons from the set comprising the first comparison, second comparison, and third comparison, and wherein each of the two comparisons further includes a depiction of a corresponding mean threshold.

12. The method of claim 1, wherein the one or more other specific users comprises a plurality of other specific users and wherein the representation further comprises an indicator, with regard to each of the other specific users, as to whether recertification of the other specific users is recommended to be accepted or rejected.

13. A computer program product comprising a non-transitory computer readable medium having a computer readable program stored therein, wherein the computer readable program, when executed on a computing device of a data processing system, causes the computing device to:
collect, from a system resource of the data processing system, access information representative of accesses of the system resource by a user access entitlement of a specific user;
determine that recertification of the user access entitlement, with regard to the system resource, is to be performed;
determine a pattern of access based on the access information for the user access entitlement; and
output a recertification request graphical user interface to a user based on the pattern of access, wherein the graphical user interface comprises the pattern of access and one or more graphical user interface elements for receiving a user input specifying acceptance or denial of the recertification of the user access entitlement, wherein the representation of the pattern of access comprises a comparison of a first access metric associated with the user access entitlement of the specific user to a second access metric associated with one or more other user access entitlements of one or more other specific users, and wherein the first access metric and the second access metric are statistical values indicative of previous access operations by corresponding user access entitlements.

14. The computer program product of claim 13, wherein the computer readable program causes the computing device to collect access information from the system resource by receiving the access information from an agent component executing on an end system associated with the system resource.

15. The computer program product of claim 13, wherein the computer readable program causes the computing device to determine that recertification of the user access entitlement with regard to the system resource is to be performed by determining that a triggering condition specified in a recertification policy of the data processing system has occurred with regard to the user access entitlement.

16. The computer program product of claim 13, wherein the computer readable program causes the computing device to determine a pattern of access by:
determining a context to use as a basis for determining the pattern of access, wherein the context comprises at least one of an identity sub-context, resource sub-context, or transaction sub-context; and
determining the pattern of access by analyzing a portion of the access information, specifying previous access operations previously executed, corresponding to one or more of the identity sub-context, resource sub-context, or transaction sub-context.

17. The computer program product of claim 16, wherein the computer readable program causes the computing device to determine the context to use as a basis for determining the pattern of access by:
sending a recertification notification to a user computing device indicating that recertification of the user access entitlement is necessary;
performing a login operation of the user computing device; and
in response to performing the login operation successfully, providing to the user computing device, a graphical user interface for inputting characteristics of the context.

18. The computer program product of claim 13, wherein the one or more other user access entitlements are user access entitlements having a group association corresponding to a same group identifier as the user access entitlement for which recertification is sought.

19. The computer program product of claim 18, wherein the graphical user interface comprises the pattern of access in the form of a graphical depiction of the first metric relative to the second metric and one or more threshold values.

20. The computer program product of claim 13, wherein the computer readable program further causes the computing device to:
determine a recommendation as to whether to accept or deny the recertification of the user access entitlement based on results of the determination of the pattern of access, wherein the recertification graphical user interface further comprises the recommendation.

21. An apparatus, comprising:

a processor; and a memory coupled to the processor, wherein the memory comprises instructions which, when executed by the processor, cause the processor to:

collect, from a system resource of the data processing system, access information representative of accesses of the system resource by a user access entitlement of a specific user;

determine that recertification of the user access entitlement, with regard to the system resource, is to be performed;

determine a pattern of access based on the access information for the user access entitlement; and output a recertification request graphical user interface to a user based on the pattern of access, wherein the graphical user interface comprises the pattern of access and one or more graphical user interface elements for receiving a user input specifying acceptance or denial of the recertification of the user access entitlement, wherein the representation of the pattern of access comprises a comparison of a first access metric associated with the user access entitlement of the specific user to a second access metric associated with one or more other user access entitlements of one or more other specific users, and wherein the first access metric and the second access metric are statistical values indicative of previous access operations by corresponding user access entitlements.

* * * * *